US006973492B2

(12) United States Patent
Streble

(10) Patent No.: US 6,973,492 B2
(45) Date of Patent: Dec. 6, 2005

(54) METHOD AND APPARATUS FOR COLLECTING PAGE LOAD ABANDONS IN CLICK STREAM DATA

(75) Inventor: Mary Catherine Streble, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 09/949,033

(22) Filed: Sep. 7, 2001

(65) Prior Publication Data

US 2003/0051031 A1    Mar. 13, 2003

(51) Int. Cl.⁷ .............................................. G06F 15/16
(52) U.S. Cl. ...................... 709/224; 709/219; 709/227; 715/513
(58) Field of Search .......................... 714/4; 709/224, 709/228, 217, 219, 227; 715/513

(56) References Cited

U.S. PATENT DOCUMENTS

| | | | |
|---|---|---|---|
| 5,659,702 A * | 8/1997 | Hashimoto et al. ......... 709/245 |
| 5,778,372 A * | 7/1998 | Cordell et al. ............... 707/100 |
| 5,870,559 A | 2/1999 | Leshem et al. ........ 395/200.54 |
| 5,896,502 A * | 4/1999 | Shieh et al. ................. 709/224 |
| 5,951,642 A | 9/1999 | Onoe et al. .................. 709/224 |
| 5,958,008 A | 9/1999 | Pogrebisky et al. ........ 709/223 |
| 5,960,409 A | 9/1999 | Wexler ......................... 705/14 |
| 5,974,572 A | 10/1999 | Weinberg et al. ............. 714/47 |
| 6,003,082 A * | 12/1999 | Gampper et al. ............ 709/225 |
| 6,018,619 A | 1/2000 | Allard et al. .......... 395/200.54 |
| 6,021,439 A | 2/2000 | Turek et al. ................. 709/224 |
| 6,029,182 A * | 2/2000 | Nehab et al. ................ 715/523 |
| 6,035,332 A * | 3/2000 | Ingrassia et al. ............. 709/224 |
| 6,078,956 A * | 6/2000 | Bryant et al. ................ 709/224 |
| 6,112,238 A | 8/2000 | Boyd et al. .................. 709/224 |
| 6,112,240 A * | 8/2000 | Pogue et al. ................. 709/224 |
| 6,144,962 A | 11/2000 | Weinberg et al. ............. 707/10 |
| 6,178,439 B1 * | 1/2001 | Feit ............................. 709/200 |
| 6,182,097 B1 | 1/2001 | Hansen et al. ............... 707/526 |

(Continued)

OTHER PUBLICATIONS

Orfali, Robert, and Harkey, Dan. Client/server programming with Java and CORBA, NY: John Wiley & Songs, Inc., 1998.*

(Continued)

Primary Examiner—Dung C. Dinh
Assistant Examiner—Philip Chea
(74) Attorney, Agent, or Firm—Synnestvedt & Lechner LLP; Martin J. McKinley

(57) ABSTRACT

The invention is a method and apparatus for detecting page load abandons in real time. Particularly, a page includes code that generates a unique record correlation ID that identifies the particular page that is being loaded and the particular instance of its loading and embeds that ID in two special tags in that page. The first tag is at the top of the page and the second tag is at the bottom of the page. The first tag causes the client to send a request to a Usage Analyzer server including the unique record correlation ID. The Usage Analyzer server receives this request and creates a log entry bearing the ID and sets a page load abandon flag for that log entry. If the page finishes loading, the client machine encounters the second tag. That tag causes the client to send another request to the Usage Analyzer server with the same ID. When the Usage Analyzer server receives this request, it resets the page load abandon flag.

18 Claims, 2 Drawing Sheets

U.S. PATENT DOCUMENTS

| | | | |
|---|---|---|---|
| 6,230,153 B1 | 5/2001 | Howard et al. | 707/2 |
| 6,247,050 B1 * | 6/2001 | Tso et al. | 709/224 |
| 6,317,761 B1 * | 11/2001 | Landsman et al. | 715/513 |
| 6,411,998 B1 * | 6/2002 | Bryant et al. | 709/224 |
| 2002/0083188 A1 * | 6/2002 | Hericy et al. | 709/235 |
| 2002/0099818 A1 * | 7/2002 | Russell et al. | 709/224 |
| 2002/0165954 A1 * | 11/2002 | Eshghi et al. | 709/224 |
| 2002/0194296 A1 * | 12/2002 | Dutta et al. | 709/217 |
| 2003/0051157 A1 * | 3/2003 | Nguyen et al. | 713/201 |
| 2003/0069962 A1 * | 4/2003 | Pandya | 709/224 |

OTHER PUBLICATIONS

Smith, Richard. "The Web Bug FAQ." Electronic Frontier Foundation. Nov. 11, 1999. San Francisco, USA, Nov. 5, 2004 <http://www.eff.org/Privacy/Marketing/web_bug.html>.*

* cited by examiner

METHOD AND APPARATUS FOR COLLECTING PAGE LOAD ABANDONS IN CLICK STREAM DATA

FIELD OF THE INVENTION

The invention pertains to the collection of information about Web site usage. More particularly, the invention pertains to the collection of information relating to the midstream abandonment of Web page loading.

BACKGROUND OF THE INVENTION

The Internet is a vast collection of computing resources, interconnected as a network, from sites around the world. It is used every day by millions of people. The World Wide Web (referred to herein as the "Web") is that portion of the Internet that uses the HyperText Transfer Protocol ("HTTP") as a protocol for exchanging messages. (Alternatively, the "HTTPS" protocol can be used, where this protocol is a security-enhanced version of HTTP.)

A user of the Internet typically accesses and uses the Internet by establishing a network connection through the services of an Internet Service Provider (ISP). An ISP provides computer users the ability to dial a telephone number using their computer modem (or other connection facility, such as satellite transmission), thereby establishing a connection to a remote computer owned or managed by the ISP. This remote computer then makes services available to the user's computer. Typical services include: a search facility to search throughout the interconnected computers of the Internet for files of interest to the user; a browse capability for displaying information files located with the search facility; and an electronic mail facility, with which the user can send and receive mail messages from other computer users.

The user working in a Web environment will have software running on his or her computer to allow him or her to create and send requests for information, and to see the results. These functions are typically combined in a software package that is referred to as a "Web browser", or "browser". After the user has created a request using the browser, the request message is sent out into the Internet for processing. The target of the request message is one of the interconnected computers in the Internet network. That computer will receive the message, attempt to find the data satisfying the user's request, format that data for display with the user's browser, and return the formatted response to the browser software running on the user's computer.

This is an example of a client-server model of computing, where the machine at which the user requests information is referred to as the client, and the computer that locates the information and returns it to the client is the server. In the Web environment, the server is referred to as a "Web server".

The HTTP communications protocol uses a request/response paradigm, where the electronic messages sent between communicating computers can be categorized as either requests for information or responses to those requests.

Content on the Internet is stored on server computers in individual files in the form of HTML pages. HTML (HyperText Markup Language) is a Web content formatting language specifically designed for a distributed network such as the Internet. An HTML page (or file) contains HTML code, which indicates how the information content is to be displayed, as well as the actual content and/or references to other files where the content is contained. Web browser software is designed to issue requests for pages in the form of URLs (Universal Resource Locators). A URL essentially is an address of a file that is accessible through the Internet. The URL includes the name of the file that is being requested and the IP (Internet Protocol) address of the server on which it is to be found.

A user at a client machine may type a URL into an appropriate field in a GUI (Graphical User Interface) generated by the Web browser software in order to address Web pages. Another way of addressing Web pages is by hyperlinking. A hyperlink is a portion in one Web page, such as a portion of text or an image, that, when selected (such as by positioning a cursor over that portion and pressing a button on the cursor control device), automatically addresses another Web page. Thus, for example, by manipulating one's mouse to cause the screen cursor to move over the hyperlink and clicking, the page addressed by that hyperlink is accessed by the browser.

Each request is routed through the Internet to the server identified in the URL. That server then returns the requested page through the Internet to the client machine that requested it.

HTTP does not provide for maintaining any type of state information about the communications, instead treating each request/response pair as a separate and unrelated transaction. However, there are many cases for which it is desirable to associate multiple http requests from a single client to a single server with each other so as to be able to maintain state information.

One example scenario where state information is an absolute necessity is on-line shopping, including the gathering of user profile information. In on-line shopping, a user typically accesses a seller's on-line catalog, which will be displayed to him as some number of Web pages. Typically, the user can display a separate page of information related to each product, to read about the details of that product. Each time the user requests to see a page, a separate HTTP request is typically sent to the Web server where the seller's product catalog is stored. When the user wishes to order a product, he indicates his selection by clicking on an "Order" button of some type, using a mouse, for example. This causes another request message to be sent to the server, where the request indicates that this is an order for the particular item. Without the ability to maintain state information, each of these requests would be treated as unrelated to the others. There would be no efficient way to collect orders for more than one item into one large order. Further, there would be no efficient way to allow the user to enter his name, address, credit card number, etc. only one time, and have that information apply to all the ordered items.

Even further, it also is frequently desirable to be able to maintain state information across multiple, separate, visits by a particular individual to a particular Web site. For instance, it may be desirable for a retail Web site to store all of the information that it typically needs to process a purchase order by an individual and associate that information with the individual every time he or she visits the Web site. Then the individual will not need to re-enter the same information, such as name, credit card No., billing address, shipping address, etc., every time he or she visits the Web site and purchases an item.

Accordingly, ways have been developed outside of the http protocol itself for maintaining such state information. One of the earliest ways developed for doing this was the use of cookies.

Cookies are small data files that a server might send to a client machine and that the client's Web browser knows to store in a designated cookie folder. A cookie contains pertinent information about the user as well as information that the browser uses to determine which Web site (i.e., which URL) to which the cookie pertains. Thereafter, when that client machine sends a HTTP request for a Web page meeting the URL criteria set forth in a cookie, the client's Web browser software includes that cookie in the request. The purpose of cookies is to inform a server of relevant information about the user that issued the request. Cookies might contain any particular information that a Web site operator feels the need to have in order to better service its customers. As an example, many Web sites allow individual clients to customize Web pages, such as a daily, electronic, newspaper containing only those articles that meet certain criteria selected by the customer and which criteria are stored as part of a cookie. Frequently, cookies contain merely a session ID that identifies the particular client machine and the Web site operator stores the actual information of interest associated with that session ID on its own server and retrieves that information when it receives a HTTP request containing a cookie containing that particular session ID.

Countless commercial, educational, government and other institutions operate servers containing HTML pages that are accessible to client machines via the Internet. The term Web site generally refers to a collection of HTML pages that are maintained on (or generated on-the-fly by) a server by or on behalf of a single entity and that are related to each other in some fashion. Large Web site operators may own their own server (or a server farm comprising multiple servers) dedicated to a single "Web site". On the other hand, smaller Web site operators may farm out maintenance of their Web sites to other companies that might support multiple Web sites on a single physical server machine.

Most Web site operators, and particularly commercial Web site operators, have a desire to make their Web sites as convenient and attractive to users as possible so that they can attract and keep customers as well as advertisers. Accordingly, many Web site operators have a strong desire to keep track of the ways in which individuals utilize the Web site in order to determine which aspects of a Web site users like or dislike. Useful information in terms of making such determinations include things such as (1) from what other Web sites users have hyperlinked to your Web site, (2) which pages on your Web site receive the most and/or fewest hits, (3) how long visitors tend to view a particular page, (4) on which pages users have entered the Web site, (5) from which pages users have exited the Web site to go to another Web site (or log off the Internet altogether), (6) the identities or at least demographic characteristics of visitors of the Web site, and (7) the particular browser software used by visitors.

A satisfying user experience is key to the success of a corporate, agency or private Web site. In a well designed Web site, users generally progressively navigate through the Web site using expected paths. The page from which the user enters and leaves the Web site should be "expected". When a user's path through a Web site is erratic or unexpected, it very well may be an indication of a poorly designed Web site or, at least, a visitor who probably did not have a satisfying experience at the Web site. An unsatisfied user will frequently leave the Web site from an unexpected page. Additionally, frustrated users often cancel the loading of a Web page before it is completely loaded. Common reasons for canceling the loading of a page midstream include poor page load performance (e.g., the page loads too slowly) or a realization by the user from the information first displayed on the page that the page does not contain the desired information.

Traditional log file analysis techniques can be used to gather click stream data of users of a particular Web site to develop a log of data indicating the page (or resource) requests made by Web site users in order to collect some of the aforementioned useful information.

A technology commonly called "Single-Pixel" technology has been developed that can be used to gather information similar to the information gathered through traditional log file analysis. With Single-Pixel technology, tags can be embedded in an HTML page that cause the browser at the client machines that receive that page to send click stream information to a click stream analysis engine on a server. In Single-Pixel technology, an HTML <IMG> tag is embedded in the page. The <IMG> tag addresses an image stored on the Usage Analyzer server. The Usage Analyzer knows the identity of the particular client machine that issued the request since its address is contained in the request. Thus, the Usage Analyzer can maintain a log of the pages visited by whom and the order in which they were visited.

The Usage Analyzer also returns the requested image. However, the images is only one pixel and transparent. Hence, the user at the client machine cannot see the image and the entire operation is essentially transparent to the user. While the Single-Pixel technology technique is becoming increasingly popular in the industry, current solutions gather information either at the beginning or at the end of each page load process. These solutions, therefore, are unable to detect when a page load has been terminated midstream and, therefore, can miss valuable click stream information.

Accordingly, it is an object of the present invention to provide an improved method and apparatus of collecting click stream information.

It is another object of the present invention to provide a method and apparatus for detecting when a page load has been abandoned midstream.

SUMMARY OF THE INVENTION

The invention is a method and apparatus for detecting page load abandons in real time. Particularly, each page associated with a Web site includes a Single-Pixel image tag, i.e., <IMG>, that sends a HTTP request to a Usage Analyzer server, the request identifying the particular page which is being loaded and uniquely identifies the particular instance of its loading (herein termed a record correlation ID). The <IMG> tag is positioned in the HTML source code of the page as close to the top of the page as possible so that the <IMG> tag is encountered by the browser and the corresponding request is issued as soon after the page starts loading as possible. The HTML page also should include JavaScript or similar code that generates the unique record correlation ID and inserts it in the <IMG> tag.

In accordance with the invention, a <FORM> tag comprising the HIDDEN attribute also is embedded in the page. Code, such as JavaScript code, also is embedded in the page that determines when the page load is completed and submits the <FORM> tag to the Usage Analyzer at that time. The <FORM> tag addresses the Usage Analyzer server and includes the same unique record correlation ID as the aforementioned <IMG> tag. The location of the <FORM> tag within the page is insignificant since the timing of the FORM submission is after the page loading completes. The code, for instance, can detect a browser generated "onLoad" event that is generated when all of the content of the page has completely loaded, including any externally located content, such as gif files, servlets, audio files, etc. It is only after all phases of the HTML parsing and content loading are completed that the hidden FORM is submitted.

When the Usage Analyzer receives the <IMG> request including the record correlation ID, it stores the record correlation ID in a log and sets a page load abandon flag corresponding to that log entry to true. If the user interrupts the page load before it is completed, no further action is taken and the Usage Analyzer, thus, contains in its log an indication that the page load of that page had been initiated and did not complete (i.e., it was abandoned mid stream).

If the page finishes loading, the client machine Web browser submits the hidden FORM to the Usage Analyzer server. Thus, if the Usage Analyzer server receives a <FORM> request containing the same record correlation ID as one of its log entries that was made responsive to receipt of one of the aforementioned <IMG> tags, it knows that the Web browser generated a page load completion event and thus fully loaded the page without an abandonment. Therefore, the Usage Analyzer resets the page load abandon flag for that entry to false. In this manner, the Usage Analyzer keeps track of which page loads have and have not been abandoned midstream.

DETAILED DESCRIPTION OF THE INVENTION

Figure 1:
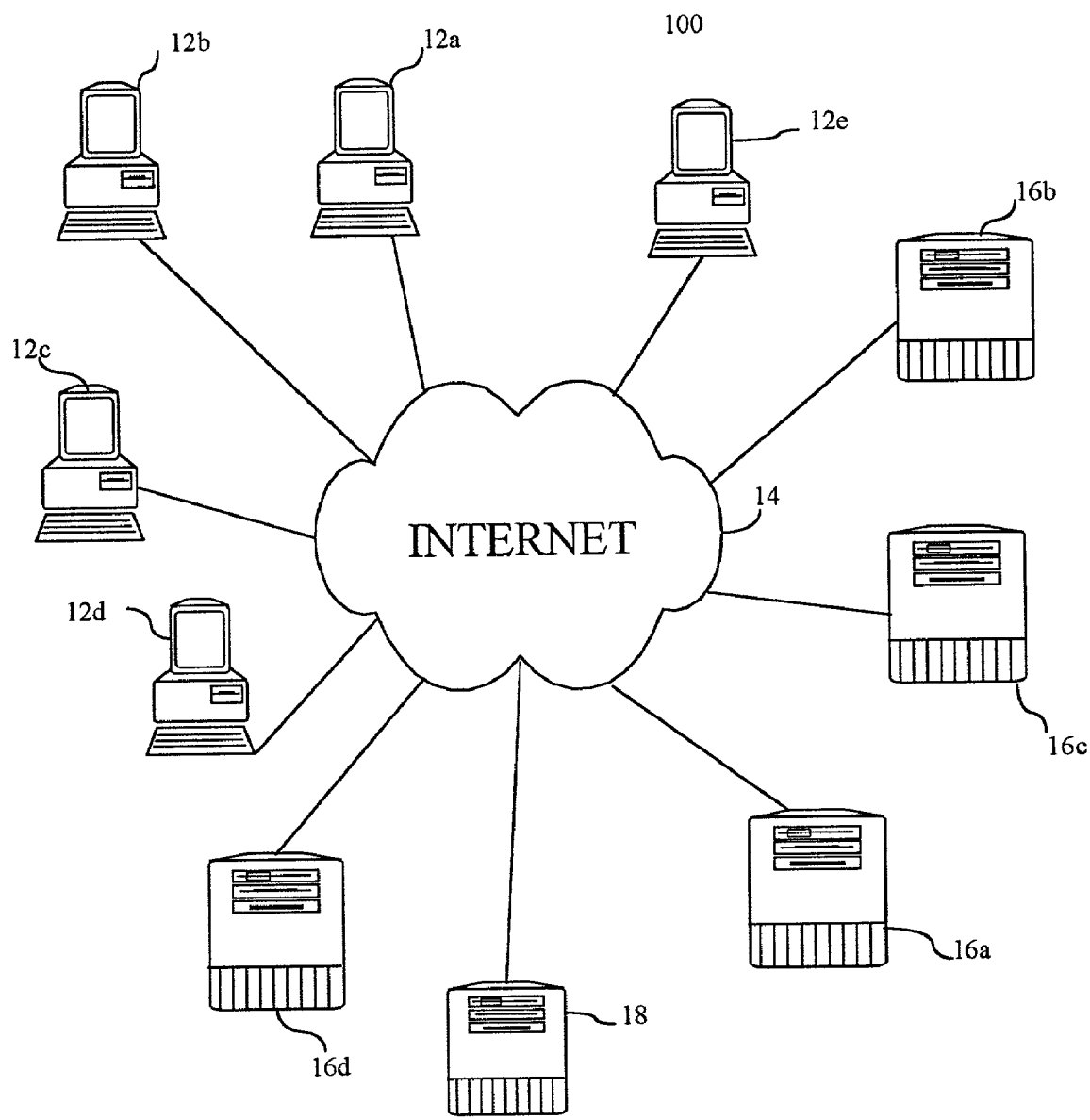
FIG. 1 is a block diagram illustrating the basic components involved in the practice of the present invention in connection with a distributed network.

FIG. 1 is a block diagram of a network, such as the Internet, in which the present invention is implemented. The network is shown as blob 14 and comprises a series of interconnected computers, routers and switches (not shown) that essentially allow any computer on the network to communicate with any other computer on the network. Computers 12a through 12e are client computers that issue requests via the Internet to server machines on the Internet. Computers 16a through 16d are servers that serve information to client machines responsive to requests received from those client machines via the Internet. Those of skill in the art will understand that some Web site operators maintain a plurality of servers (sometimes called a server farm) for a single Web site. On the other hand, other companies, such as Web hosting companies, maintain multiple Web sites for multiple customers on a single server. However, in order not to obfuscate the invention, we shall assume that each server 16a–16d is operated by a single Web site operator.

In accordance with the invention, each Web page for which a Web site operator wishes to determine if its loading has been abandoned midstream is modified to include two extra tags. The first extra tag is an <IMG> tag that is placed as close to the top of the page as possible. The <IMG> tag is a Single-Pixel tag in that it does not actually refer to an image, but instead refers to a Web server 18 that collects page abandon information in accordance with the present invention (hereinafter the Usage Analyzer server 18). Persons of skill in the related arts will understand that Usage analyzer server need not be a separate physical server, but could be incorporated into any other physical server machine 16a–6d. In fact, it is envisioned that the Usage Analyzer server frequently will be incorporated in the same server or server farm that supports the particular Web site or Web sites that utilize the present invention.

The Web page also has embedded therein code that can be automatically run by the client machine, such as JavaScript code, that generates a unique record correlation ID. The record correlation ID not only identifies the particular page requested, but also uniquely identifies the particular instance of its request. The JavaScript code also embeds the unique record correlation ID in the aforementioned <IMG> tag before the corresponding <IMG> request is sent out.

When the Usage Analyzer server receives the request that is generated by the aforementioned <IMG> tag, it parses it to read the record correlation ID, enters the record correlation ID in a log, and sets a page abandoned flag corresponding to that log entry to true. The set or true condition of the page abandoned flag indicates that the page load has been abandoned midstream. The Usage Analyzer responds to the request for the image by returning a one pixel, transparent image so that the above-described operation is essentially transparent to the user of the client machine.

Back at the client machine, the page load continues until either it completes loading or is abandoned midstream by user operation. Also embedded in the HTML code of the page is the second extra tag mentioned above. This tag can be a <FORM> tag with a HIDDEN attribute. In HTML, when a page load is completed, the client machine's Web browser generates an "onLoad" event. The page can contain code, such as JavaScript code, that detects the "onLoad" event and submits a request containing the <FORM> tag responsive to such detection. The <FORM> tag references the URL of the Usage Analyzer server once again and also has embedded therein the unique record correlation ID. When the Usage Analyzer receives the FORM request, it parses it to read the record correlation ID. It then searches the log for the entry bearing the same record correlation ID and resets the corresponding page abandon flag to false. The Usage Analyzer also responds to the <FORM> tag. Preferably, the Usage Analyzer responds to the HTTP FORM request with a response to the client machine that indicates NO CONTENT is returned, thereby not altering the page content.

In an alternative embodiment, instead of a <FORM> tag and JavaScript code, the page load complete indication can be sent to the Usage Analyzer by using a second <IMG> tag embedded in the page. The second <IMG> tag should be embedded in the page as close to the bottom of the page as possible. In this manner, the fact that the Browser encountered it and sent out the corresponding request reasonably correlates to the fact that the page load completed. Those of skill in the art will note that the second <IMG> tag cannot actually be the last code in the HTML page and that images and other embedded files in an HTML page may continue loading after the last tag in the page is encountered. Thus, the fact that the second <IMG> tag was encountered is not as accurate an indication that the page completed loading at the client Browser as the aforementioned <FORM> tag embodiment of the invention.

In this manner, a log is maintained of all the pages that are requested and whether or not the page load was abandoned midstream. In most practical embodiments, the Usage Analyzer server also will collect additional click stream and usage data. The present invention can by utilized in conjunction with any other mechanism for collecting such data.

Figure 2:
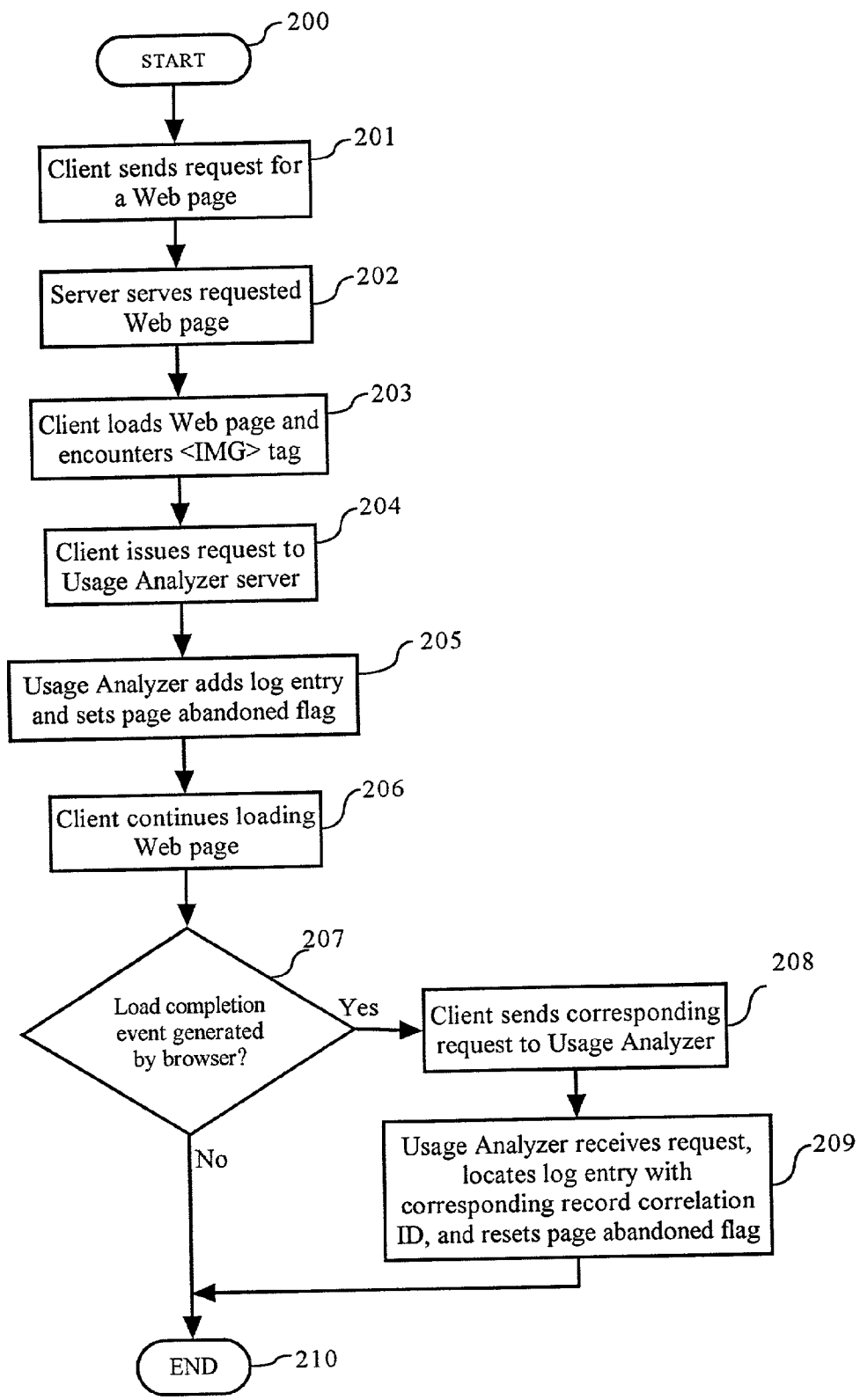
FIG. 2 is a flow diagram illustrating steps performed in accordance with the present invention.

The flow chart of FIG. 2 shows steps that are performed both at the Usage Analyzer server and at the client's Web browser in accordance with at least one embodiment of the present invention. It should be apparent from the following description and the flowchart itself which steps are performed at which computing device.

The process starts in step 200. In step 201, under the control of an operator, browser software at a client machine requests a Web page. In step 202, the server corresponding to the URL contained in the request returns the requested Web page to the requesting client machine. In accordance with the present invention, that Web page has embedded therein an <IMG> tag as close as possible to the top of the page, a <FORM> tag, JavaScript code that will generate and embed a unique record correlation ID in the two aforementioned tags, and JavaScript code to capture a load completion event and submit the FORM.

In step 203, the client browser loads the Web page and executes the JavaScript code which generates the unique record correlation ID and embeds it in the aforementioned <IMG> and <FORM> tags. In step 204, the client browser issues a request to the Usage Analyzer server as dictated by the <IMG> tag encountered at the top of the page. In step 205, the Usage Analyzer server receives and logs in the <IMG> request, and sets the page load abandoned flag to true.

Back at the client browser, the page continues to load as indicated in step 206. The operator either allows the page to load until it is completed or abandons the page load midstream, as reflected in step 207. If the operator abandons the load midstream, flow proceeds to the end (step 210) and the process is essentially completed. The log at the Usage Analyzer server had previously logged the page load instance and set the page load abandoned flag to true, indicating that the page load was abandoned midstream.

If, on the other hand, the operator allows the page to load until completion, flow proceeds from step 207 to step 208, in which the browser eventually generates a load completion event, which is captured by JavaScript code, and the transparent FORM is sent to the Usage Analyzer server. In step 209, the Usage Analyzer receives this request, locates the log entry bearing the same record correlation ID as this request and resets the corresponding page load abandoned flag to false. The process ends at step 210. Accordingly, if the page is allowed to complete loading, the log will contain an entry reflecting that particular page load and that it was completed.

The description of the above-mentioned invention is merely a description of one or more particular possible embodiments of the invention. There are alternative ways of accomplishing some of the tasks in accordance with the present invention that should be apparent to persons of skills in the art. For instance, the, second tag embedded in the page need not be a <FORM> tag. It can be another Single-Pixel <IMG> tag. Alternately, the second tag can be any tag that will cause the browser to send a request to the Usage Analyzer containing the record correlation ID and indicating that the page load has been completed.

Further, the code embedded in the page to insert the unique record correlation ID into the aforementioned tag can be any form of code that can be automatically executed at the client machine, JavaScript merely being an example of one suitable type of code.

Having thus described a few particular embodiments of the invention, various alterations, modifications, and improvements will readily occur to those skilled in the art. Such alterations, modifications and improvements as are made obvious by this disclosure are intended to be part of this description though not expressly stated herein, and are intended to be within the spirit and scope of the invention. Accordingly, the foregoing description is by way of example only, and not limiting. The invention is limited only as defined in the following claims and equivalents thereto.

I claim:

1. A method of detecting abandonment of a page load in a communication network, said method comprising the steps of:
   (1) maintaining a server on said network;
   (2) embedding within a page first code that will cause a machine loading said page to send a first message to said server indicating that said page has commenced loading;
   (3) embedding within said page second code that will cause said machine loading said page to send a second message to said server indicating that said page has completed loading; and
   (4) responsive to receipt at said server of said first message, storing at said server a log entry indicating the page that is loading and the particular instance of its loading; and
   (5) responsive to receipt at said server of said second message, placing in said log information indicating that said instance of said page being loaded was not abandoned prior to completion.

2. The method claim 1 wherein step (4) further comprises storing an indication that said instance of loading of said page was abandoned and wherein step (5) comprises altering said indication that said instance of said page loading was abandoned.

3. The method claim 2 wherein, in step (4), said step of storing an indication that said instance of loading of said page was abandoned comprises setting a flag to a first condition and wherein, in step (5), said step of altering said indication that said instance of loading of said page was abandoned comprises setting said flag to a second condition.

4. The method claim 1 wherein steps (2) and (3) comprise placing first and second HTML tags, respectively, in said page.

5. The method claim 4 wherein step (2) comprises placing said first tag as close to the top of said page as possible and step (3) comprises submitting data within the second tag in response to an HTML browser generated event indicating that the page load has completed.

6. The method claim 5 wherein said first tag is an HTML <IMG> tag.

7. The method claim 5 wherein said second tag is an HTML <FORM> tag.

8. The method claim 7 wherein said <FORM> tag contains the HIDDEN attribute.

9. The method claim 6 wherein said second tag is an <IMG> tag placed as close to the bottom of the page as possible.

10. The method claim 1 wherein steps (2) and (3) comprise placing first and second HTML tags, respectively, in said page.

11. The method claim 10 further comprising the step of: (6) embedding in said page third code that will execute upon receipt at said client that will generate an identification code that identifies said page being loaded and further uniquely identifies the particular instance of its loading and embedding said identification code in said first and second tags.

12. The method claim 11 wherein said third code comprises JavaScript code.

13. A computer program product embodied on a computer readable medium for collecting data concerning abandonment of page loads in a communication network, said product comprising computer executable instructions for:

(1) responsive to receipt, at a server, of a first message received via said network, said first message sent from a machine loading a page responsive to first code embedded in said page, containing identification data identifying said page and a particular instance of its loading, storing said identification data in a memory; and (2) responsive to receipt of a second message via said network, said second message sent from said machine responsive to second code embedded in said page and containing said same identification data, storing in said memory information indicating that said instance of said page being loaded was not abandoned prior to completion.

14. The computer program product claim 13 wherein said computer executable instructions further stores an indication that said instance of loading of said page was abandoned and wherein said computer executable instructions for step (2) alters said indication that said instance of said page loading was abandoned.

15. The computer program product claim 14 wherein said computer executable instructions for storing an indication that said instance of loading of said page was abandoned comprises computer executable instructions for setting a flag to a first condition and wherein said computer executable instructions for altering said indication that said instance of loading of said page was abandoned comprises computer executable instructions setting said flag to a second condition.

16. The computer program product claim 13 wherein said first and second messages comprise HTML requests.

17. The computer program product claim 16 wherein said first message contains a request for an image and wherein said computer program product further comprises code for returning a one pixel, transparent image responsive to receipt of said first message.

18. The computer program product claim 17 wherein said second message contains an HTML form and wherein said computer program product further comprises code for returning a NO CONTENT message responsive to receipt of said second message.

* * * * *